US010148084B2

(12) United States Patent
Forghani-Zadeh et al.

(10) Patent No.: US 10,148,084 B2
(45) Date of Patent: Dec. 4, 2018

(54) OVERVOLTAGE PROTECTION CIRCUIT FOR USB INTERFACE (71) Applicant: Texas Instruments Incorporated, Dallas, TX (US)

(72) Inventors: Hassan Pooya Forghani-Zadeh, Fort Worth, TX (US); Timothy Bryan Merkin, Richardson, TX (US); Ariel Dario Moctezuma, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 537 days.

(21) Appl. No.: 14/969,026

(22) Filed: Dec. 15, 2015

(65) Prior Publication Data

US 2016/0190794 A1 Jun. 30, 2016

Related U.S. Application Data (60) Provisional application No. 62/096,713, filed on Dec. 24, 2014.

(51) Int. Cl.
H02H 3/20 (2006.01)
H02H 9/04 (2006.01)
H02H 7/20 (2006.01)

(52) U.S. Cl.
CPC ............ *H02H 7/20* (2013.01); *H02H 9/045* (2013.01); *H02H 9/048* (2013.01)

(58) Field of Classification Search
CPC ............ H02H 3/20; H02H 9/04; H02H 3/207
USPC .......................................... 361/86, 91.1–91.7
See application file for complete search history.

(56) References Cited

U.S. PATENT DOCUMENTS

| 2007/0283076 | A1* | 12/2007 | Kim | G06F 13/385 710/315 |
| 2008/0165460 | A1* | 7/2008 | Whitby-Strevens | G06F 13/4072 361/86 |
| 2008/0215765 | A1* | 9/2008 | Butler | G06F 1/3203 710/15 |
| 2010/0090644 | A1* | 4/2010 | Nokkonen | G06F 1/26 320/107 |

(Continued)

OTHER PUBLICATIONS

"USB Charging Port Controller and Power Switch with Load Detection", Texas Instruments, TPS2546, SLVSbJ2A, Feb. 2013, Revised Feb. 2013, 40 pgs.

(Continued)

*Primary Examiner* — Dharti Patel
(74) *Attorney, Agent, or Firm* — Michael A. Davis, Jr.; Charles A. Brill; Frank D. Cimino (57) ABSTRACT

Protection circuits, USB interface integrated circuits, and methods for protecting host circuitry from USB port pin overvoltages, in which a switch is connected between a USB port pin and a middle node, and a detection circuit compares the middle node voltage with a reference voltage. A control circuit turns off the switch and turns on a clamp circuit to conduct pull down current from the middle node in response to the middle node voltage exceeding the reference voltage to mitigate overvoltage conditions on a host pin coupled to the middle node. When the middle node voltage falls below the reference voltage, the control circuit delays for a predetermined time and then turns off the clamp circuit and turns on the switch.

20 Claims, 5 Drawing Sheets

(56) References Cited

U.S. PATENT DOCUMENTS

| | | | |
|---|---|---|---|
| 2014/0013012 A1* | 1/2014 | Terlizzi | G06F 13/38 710/15 |
| 2014/0207977 A1* | 7/2014 | Hang | G06F 13/385 710/16 |
| 2015/0137789 A1* | 5/2015 | Furtner | G05F 5/00 323/318 |

OTHER PUBLICATIONS

"Universal Serial Bus Power Delivery Specification", Revision 2.0, V1.0, Aug. 11, 2014, Section 2—Overview, cover sheet and pp. 41-56.

"Universal Serial Bus Power Delivery Specification", Revision 2.0, V1.0, Aug. 11, 2014, Section 5—Physical Layer, pp. 102-140.

"Universal Serial Bus Power Delivery Specification", Revision 2.0, V1.0, Aug. 11, 2014, Section 6—Protocol Layer, pp. 141-207.

"Universal Serial Bus Power Delivery Specification", Revision 2.0, V1.0, Aug. 11, 2014, Section 8—Device Policy, Part 1 (pp. 268-350) and Part 2 (pp. 351-450).

"Universal Serial Bus Type-C Cable and Connector Specification", Revision 1.0, Aug. 11, 2014, USB 3.0 Promoter Group, Part 1 (pp. 1-84) and Part 2 (pp. 85-171).

* cited by examiner

FIG. 5

OVERVOLTAGE PROTECTION CIRCUIT FOR USB INTERFACE

REFERENCE TO RELATED APPLICATION

Under 35 U.S.C. § 119, this application claims priority to, and the benefit of, U.S. provisional patent application Ser. No. 62/096,713, entitled "PORT SWITCHED HICCUP OVER-VOLTAGE PROTECTION SCHEME FOR USB TYPE-C", and filed on Dec. 24, 2014, the entirety of which is hereby incorporated by reference.

TECHNICAL FIELD

The present disclosure relates to Universal Serial Bus (USB) technology and more specifically to USB interface circuits.

BACKGROUND

USB ports and cables allow interconnection of a variety of compatible electronic devices, such as desktop computers, automobile dashboard consoles and battery-powered portable devices such as laptop computers, tablets, mobile phones, e-readers and MP3 players. USB ports are accessed using standardized USB cable connections to provide serial communications between devices, as well as electrical power transfer for charging and operating battery-powered peripheral devices. USB compatible systems often include interface integrated circuits (ICs) mounted to an internal host circuit board to interface USB data and power connections to host system circuitry such as power circuits and host processors. Dedicated USB charging devices are also available having multiple USB ports for charging various portable devices, which may include circuitry for fast charging certain peripheral devices. Many desktop and laptop computers include multiple USB ports for data transfer and/or peripheral device charging.

USB power delivery (USB-PD) and Type-C (USB-C) specifications describe delivery of higher power over USB cables and connectors to provide a universal power plug for devices that may accommodate more than 5V charging power, for example, for fast or quick-charging capabilities. The USB-PD specification defines communications for negotiating voltage and current levels for power transfer from a source port to a sink port, where the power negotiation communications is independent from the normal USB communications. USB-PD defines four kinds of USB compatible devices: Provider-Only, Provider/Consumer, Consumer/Provider, and Consumer-Only. Devices that are Provider-Only, Provider/Consumer, or Consumer/Providers may sometimes be in a Source role providing DC voltage on the VBUS wire or line for the far-end device to consume or sink. USB-C recognizes three kinds of USB devices, including a downward facing port (DFP), an upward facing port (UFP), and a dual-role port (DRP). In the absence of USB PD messaging, the DFP is the source of power and the UFP is sinking the power.

USB-C cables and connectors include configuration channel (CC) lines for power configuration as well as for baseband communications. USB-PD specifications provide baseband communications using Biphase Mark Coding (BMC) for message exchange over a configuration channel (CC) wire or line of the USB cable. USB-C systems use a Type-C plug with two configuration channel lines CC1 and CC2. The USB-PD specification defines a half-duplex packet-based communication link between ports connected via a USB-PD cable and connectors to exchange information that enables the two ports to communicate and negotiate the voltage and current provided from a Source port to a Sink port. The ports can negotiate to switch roles (Source to Sink and vice versa). The BMC communications on the CC lines is independent from the normal USB communications that go through D+ and D− lines of the USB cable. The CC line or lines may also be used for negotiating power transfer configurations of connected devices by way of analog signal levels. For example, up to 15 W of power can be delivered for USB Type-C cables without USB-PD messaging by controlling the DC voltage on the CC pin.

In addition, USB Type-C cables include sideband usage or SBU lines, and USB Type-C cables are powered cables facilitating multiple functionality between USB compatible devices. For instance, the SBU lines can be used for audio left and right signals. As a result of the large number of configurable functions implemented using USB Type-C interconnections, a variety of different voltage levels can be present on adjacent lines within a USB Type-C cable. As a result, short-circuits or other failures between adjacent USB Type-C cable lines can lead to overvoltage conditions which can cause stress or failure of a host circuit. For example, the nominal voltage of the CC line is determined by pull up current from the DFP device (e.g., using a pull up resistor RP or a current source) and a pull down resistor RD (or pull down current source) from the UFP device, and the CC line voltage in this configuration can vary from 0.3V to 2.4V due to combinations of the pull up and pull down levels. In addition, the baseband communication signals on the CC lines for typical BMC data packet exchange range from 0 to 1.1V. In contrast, voltages on other USB Type-C cable lines can be 5 V or other voltage levels above the normal operating range for the CC lines. In this regard, USB Type-C cables and cable plugs locate the SBU lines, the data lines D+ and D− and the CC lines adjacent or near each other, and close to the VBUS lines. A short circuit between a data or SBU line and one of the adjacent lines can therefore create an overvoltage condition.

SUMMARY

Disclosed examples include USB interface integrated circuits and protection circuitry to protect host circuits and host pins from USB port pin overvoltage conditions. The protection circuit includes a switch connected between a USB port pin and a middle node, and a detection circuit to compare the middle node voltage with a reference voltage. A control circuit turns off the switch in response to the middle node voltage exceeding the reference voltage to mitigate overvoltage conditions on a host pin coupled to the middle node. When the middle node voltage falls below the reference voltage, the control circuit in some examples delays for a predetermined time and then turns off the switch to allow the USB interface to resume normal operation following intermittent or temporary short-circuits or other overvoltage conditions. The control circuit in some examples turns on a clamp circuit to conduct pull down current from the middle node in response to the middle node voltage exceeding the reference voltage, and discontinues the clamp circuit operation the predetermined time after the middle node voltage falls below the reference voltage. In certain examples, the reference voltage is programmable or adjustable to accommodate overvoltage protection for a variety of different USB system configurations. Disclosed examples further include a method of protecting host circuits and host pins from USB port pin overvoltage conditions, including comparing a voltage signal from a node coupled to a host pin with a reference voltage, disconnecting the node from the USB port pin and conducting pulldown current out of the node in response to the voltage signal exceeding the reference voltage. The method further includes discontinuing the pulldown current and connecting the node to the USB port pin a non-zero delay time after the voltage signal from the node transitions below the reference voltage.

DETAILED DESCRIPTION

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

Figure 1:
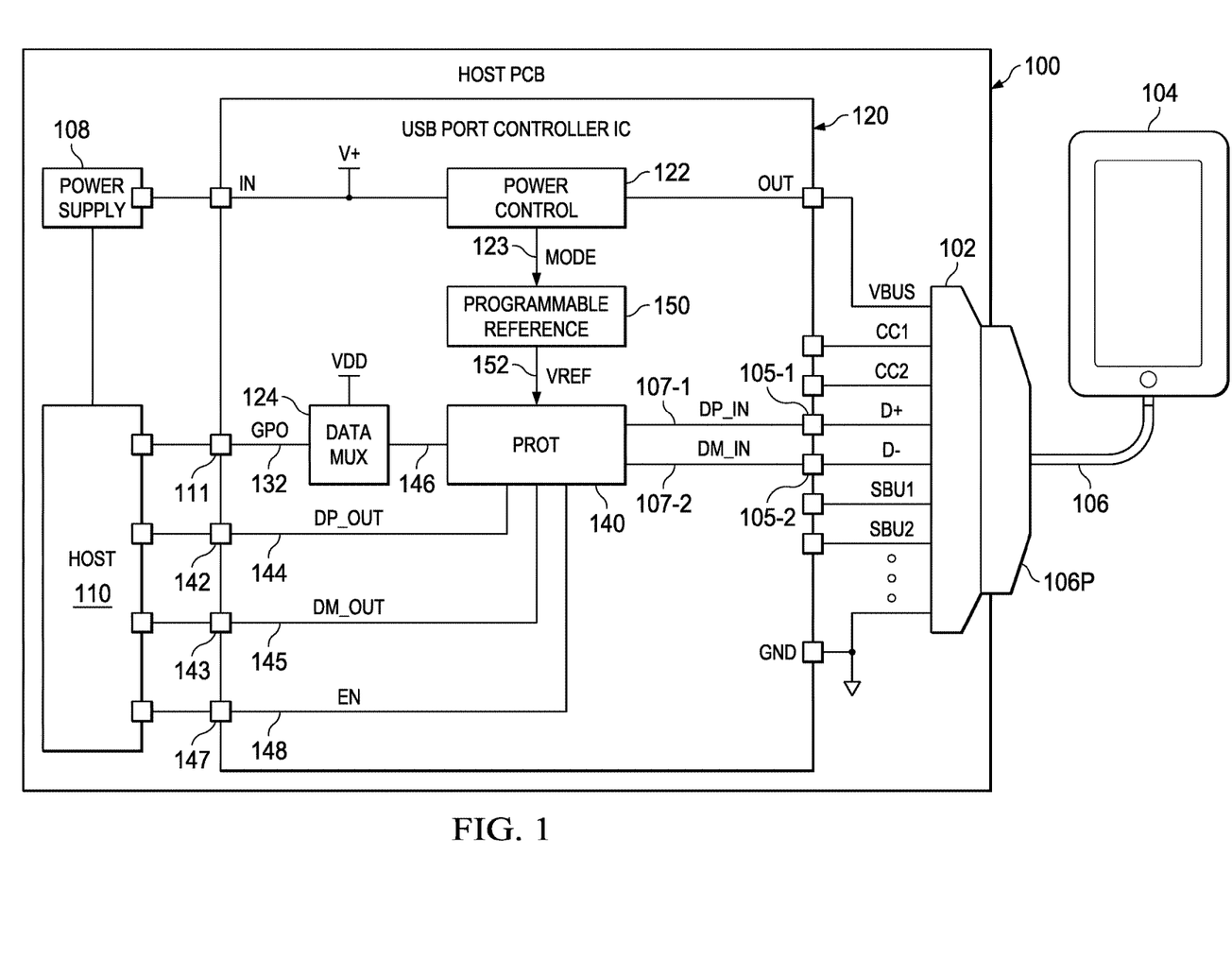
FIG. 1 is a schematic diagram of a host printed circuit board with a host circuit and a USB port controller IC interfacing with a USB compatible device through a USB cable.

FIG. 1 shows a USB host system implemented using a host printed circuit board (PCB) 100 including various circuitry implementing a USB power delivery (USB-PD) system with a USB Type-C connector 102 and cable 106. The host system 100 in one example controls power and data transfer between the host PCB 100 and a USB compatible device 104 using an associated USB Type-C cable 106, and a USB port controller integrated circuit (IC) 120. The host PCB 100 in one example includes a USB-C port connector 102 associated with a corresponding USB port and associated host circuits including a host processor 110 and a host power supply 108. The USB cable 106 in this example is terminated by a USB Type-C connector plug 106P as further illustrated in FIG. 3 below.

The USB controller IC 120 in one example includes a first pin or terminal 105-1, referred to herein as a port pin to electrically couple a first (e.g., positive or "plus") input line DP_IN 107-1 with a positive data line D+ of the USB cable 106, as well as a port pin 105-2 to couple a negative or "minus" input DM_IN line 107-2 with a negative data line D− of the cable 106. The controller IC 120 also includes a second terminal 142, referred to herein as a host pin, which electrically couples a positive data output line DP_OUT 144 with the host processor 110, and another host pin 143 which couples a negative data output line DM_OUT 145 with the host processor 110. The IC 120 further includes a host pin 111 and a corresponding coupled line 132 to provide a general purpose output GPO signal from the host 110 through a data multiplexer or "mux" 124 for transmission on the D+ cable wire. As further shown in FIG. 1, the USB connector 102 further includes VBUS (bus voltage) and GND (ground) lines for connecting the USB cable 106 with the controller IC 120, as well as first and second configuration channel lines CC1 and CC2, and sideband usage lines SBU1 and SBU2 with corresponding port pins. Protection circuitry 140 is described hereinafter in connection with protection for host pins 142 with respect to port pin 105-1. The same concepts can be applied with respect to any USB port pins for protection of any host pins of the IC 120.

In the illustrated example, a protection circuit 140 provides protected connectivity of the port pins 105 and the lines 107 to the host device 110 via a middle line or node 146 and ultimately protects the associated host pins 142 and 143. The protection circuit 140 also provides connectivity of the D+ line to the GPO host pin 111 via the data mux 124. The protection circuit 140 receives an enable control signal EN from the host processor 110 through a corresponding line 148 and a host pin 147. In operation, the enable control signal EN allows the host processor circuit 110 to enable connection of the line 144 and host pin 142 with the corresponding middle node 146 in the controller IC 120, for example, to implement digital I/O or other functions by which the host circuit 110 interacts with the middle node 146 and ultimately with the associated D+ host pin 105-1 via the corresponding line 107-1. Similar protection is provided by the circuit 140 with respect to the D− line of the cable 106. For USB Type-C ports, the interface IC 120 can provide a variety of different multiplexed interconnection configuration possibilities in which a selected circuit, whether analog circuitry, digital I/O, etc. is electrically coupled with the middle node 146 to implement a given selected function with respect to the host pin 105-1 and the corresponding data line of the USB cable 106. The data multiplexer 124 is one example of such circuitry connected to the middle node 146, and selectively allows the host processor 110 to provide digital output control of the D+ line. Multiplexer selection signals in one example are provided from the host processor 110 to the data mux 124 through multiplexer control inputs (not shown).

The host processor 110 and the controller IC 120 are powered by a power supply 108 that provides a positive voltage V+ to a first voltage node IN of the controller 120. The controller IC 120 also includes a power control circuit 122 connected to the bus voltage line VBUS of the USB Type-C connector 102 via an output terminal and port pin OUT of the IC 120. The data mux 124 receives a supply voltage VDD to power a digital output driver circuit (FIG. 2) to transmit output data to the associated D+ line 107-1 and port pin 105-1 based on the GPO general-purpose output signal from the host processor 110. In one example, the host processor 110 is a programmable or programmed processor operable when powered to execute instructions stored in an associated electronic memory (not shown) to negotiate USB power delivery parameters with the associated USB compatible device 104 connected to the connector 102 via a USB cable 106. In other examples, the host 110 can be any suitable processor, logic circuit, or other host circuitry or combinations thereof, whether implemented as a single circuit (e.g., integrated circuit or IC) or as multiple circuits or circuit components on the host PCB 100. In one example, the host system 100 provides DP_OUT and DM_OUT connections from the controller 120 to the host processor 110, and the USB controller 120 provides DM_IN and DP_IN terminals to connect to the D+ and D1 lines of the connector 102 and the associated USB cable 106. Using these connections, the host processor 110 sends and receives data packets via D+ and D− lines of the cable 106. In addition, the USB controller 120 in one example includes terminals or host pins (not shown) for transmit output and receive connections to the host processor 110 to implement baseband communications via one or both of the configuration channel port pins through the lines CC1 and CC2 of a connected USB cable 106. The protection circuit 140 in the example of FIG. 1 protects the host circuit 110 from overvoltage on USB port pins 105-1 and 105-2 (D+ and D−), respectively. An overvoltage condition on the port pin 105-1 (e.g., caused by a short circuit to a CC or SBU cable line carrying 5 V) can affect one or more of the host pins 142, 143.

Figure 2:
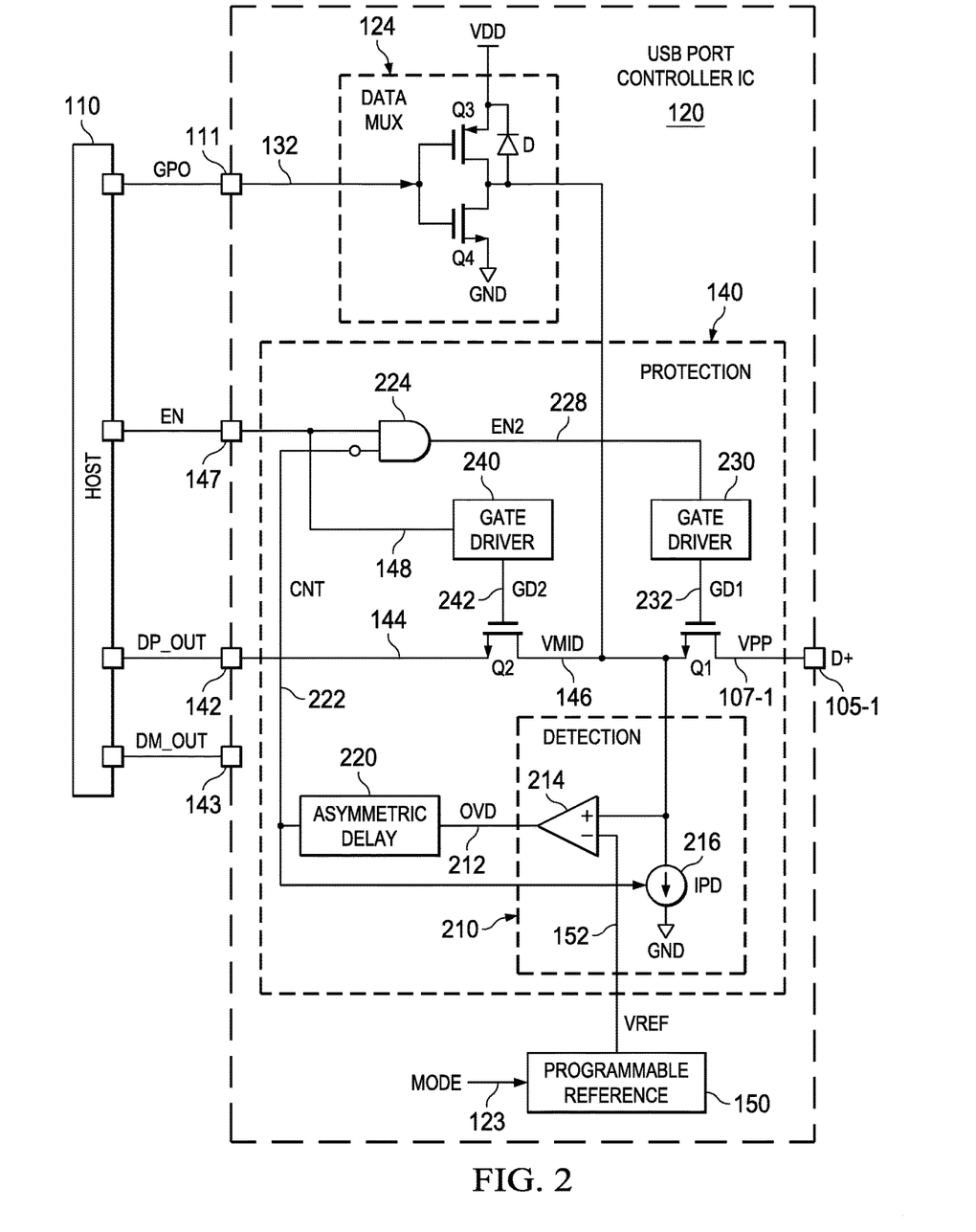
FIG. 2 is a schematic diagram of the USB port controller IC of FIG. 1 including an example circuit to protect the host circuit from overvoltage on a USB port pin.

FIG. 2 illustrates an example portion of the protection circuit 140 with respect to the middle node 146 and the D+ line 107-1 in the controller IC 120. As seen in FIG. 2, the data mux 124 includes a transmitter circuit formed by transistors Q3 and Q4 including an integral diode D connected to the drains of Q3 and Q4 at the middle node 146. The gates of Q3 and Q4 are connected to the transmit line 132 and the associated host pin 111 to receive a transmit output data signal GPO from the host circuit 110 and operate according to the transmit data to send data through the middle node 146 to the corresponding D+ host pin 105-1 through a first transistor Q1 of the protection circuit 140. The source of the upper transmitter transistor Q3 is connected to a positive supply voltage VDD, such as 3.3 V in one example. The supply voltage VDD is provided from a power circuit within the USB port controller IC 120 in one example. In another example, VDD is provided by the host processor circuit 110 or the host power supply 108 (FIG. 1) through a corresponding host pin. In addition, the data mux 124 may include a receiver amplifier (not shown) with an input connected to the middle node 146 and an output to send incoming data to the host 110 through a corresponding host pin (not shown).

Figure 3:
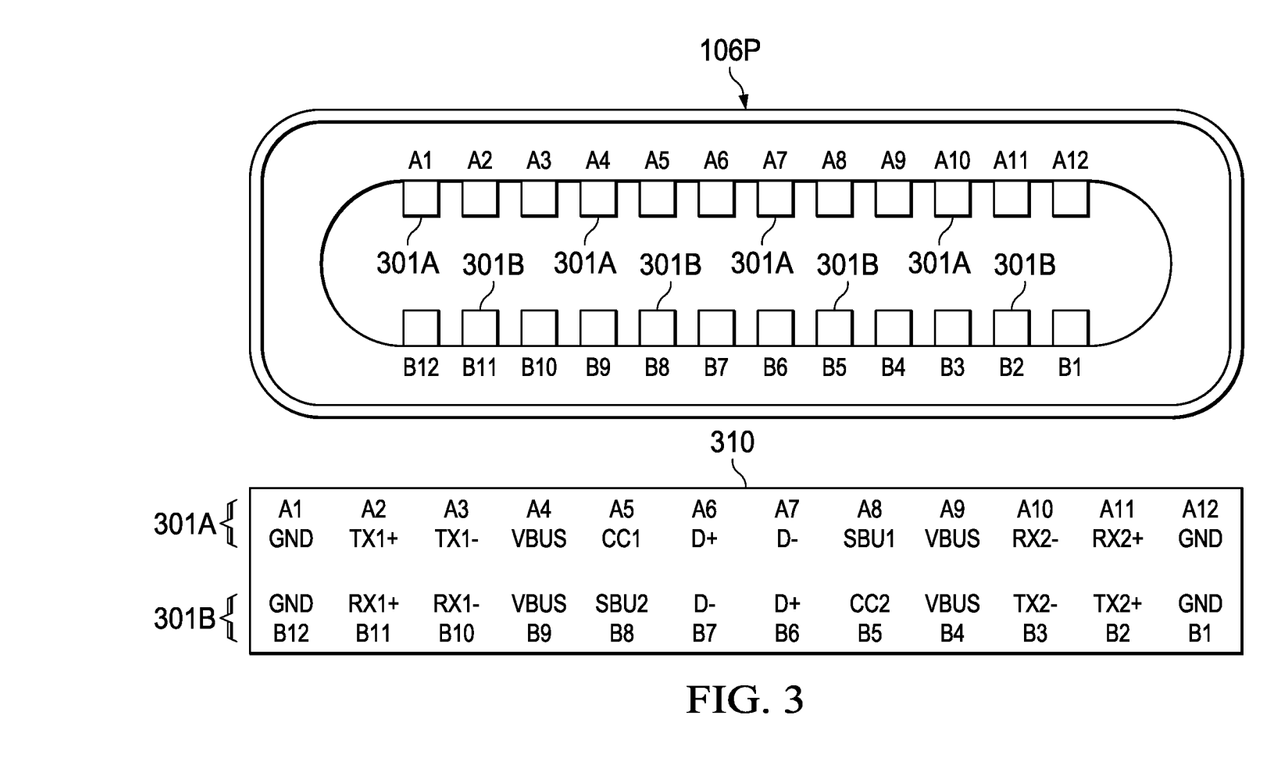
FIG. 3 is an end elevation view of a USB Type-C cable plug.

Referring also to FIG. 3, a USB Type-C connector plug 106P is illustrated. The protection circuit 140 in FIGS. 1 and 2 protects one or more of the host pins 142, 143 against conditions on the D+ line 107-1 and the associated port pin 105-1. An overvoltage on the D+ line 107-1 can be caused, for example, by a short circuit in the associated USB Type-C cable 106. For example, where the D+ line 107-1 and the associated middle node 146 shown in FIG. 2 are configured in the host system of FIG. 1 for operation at a nominal 3.3 V level (e.g., VDD=3.3 V nominally), inadvertent short-circuiting of a line in the cable 106 carrying 5 V can create an overvoltage situation on the D+ line 107-1 and the associated middle node 146. As shown in FIG. 3, the USB Type-C cable plug 106P includes a first row of connections 301A, in this case 12 connections labeled A1 through A12 from left to right in the figure, as well as a second row of connections 301B including 12 individual connections labeled B1 through B12 from right to left. FIG. 3 also shows a table 310 illustrating the signal associations for the first and second rows of connections 301 of the cable plug 106P, which also applies to the wires or lines of the associated USB Type-C cable 106. As seen in the table 310 of FIG. 3, the signal associations are such that the plug 106P can be inserted in upside up fashion or in upside down fashion, and the D+, D− lines are associated with the connections A6, A7, B6 and B7. As further shown in FIG. 3, the data lines D+ and D-2 are close or adjacent to the CC and SBU connections. Consequently, a short circuit between adjacent lines in the cable 106 may lead to one of the D+ or D− lines being short-circuited to a cable line carrying 5 V or other high voltage.

To address this situation, the IC 120 includes a protection circuit 140 in FIG. 2 to protect one or more of the host pins 142, 143 against an overvoltage condition on the port pin 105-1. Although the illustrated example includes a protection circuit 140 coupled with the D+ port pin 105-1, the protection circuit concepts of the presently disclosed examples can be implemented for protecting any host pin that is or can be electrically coupled to a host circuit (e.g., host processor circuit 110) with respect to potential overvoltage conditions on any port pin that is or can be electrically coupled to a USB cable 106. Furthermore, while the examples are described herein in association with USB Type-C cables 106 and connectors 102, the concepts of the presently disclosed examples can be used in connection with other USB cable types.

The protection circuit 140 in FIG. 2 includes a detection circuit 210 with a comparator 214 including an output 212 providing an overvoltage detection signal OVD, and a clamp circuit 216 including a pulldown current source to selectively conduct pulldown current from the middle node 146 to the constant voltage node GND. The detection circuit output 212 provides the overvoltage detection signal OVD in one example to an asymmetric delay circuit 220, which includes an output 222 providing a control signal CNT to control the clamp circuit 216. The OVD signal is also inverted and provided as a first input to an enable control gate 224 (AND gate). The enable control gate 224 has a second input connected to an enable line 148 to receive the enable signal EN from the host processor 110 through the host pin 147. In normal operation, the EN signal is active high. The gate to 24 includes an output 228 providing a second enable signal EN2 to control a first gate driver circuit 230.

The gate driver circuit 230 includes an output 232 that provides a first gate driver control signal GD1 to a first switch Q1, which can be any suitable switch such as a field effect transistor (FET) as shown in the example of FIG. 2. The first switch includes a source terminal coupled with the middle node 146, and a drain terminal coupled with the D+ port pin 105-1 to receive a signal from the USB cable 106. The switch Q1 operates according to the control signal GD1 in a first mode (ON) to allow current flow between the first and second terminals and hence between the middle node 146 and the D+ line 107-1, and in a second mode (OFF) to prevent current flow between the first and second terminals. In one example, the protection circuit 140 also includes a second switch Q2 connected between the middle node 146 and the host connection node 144. In this example, Q2 includes a gate control terminal connected to an output 242 of a second gate driver circuit 240 to receive a second gate control signal GD2. In this example, the second gate driver 240 and the second switch Q2 are operated according to the EN signal received from the line 148 and the host pin 147. This second switch Q2 allows the host processor circuit 110 to selectively connect the host pin 142 and the associated line 144 to the middle node 146 by turning on Q2, or to disconnect the host pin 142 and the line 144 from the middle node 146 by turning Q2 off. In addition, the enable signal EN is also provided to the gate 224 to allow the host circuit 110 to connect the host pin 105-1 to the middle node 146.

The protection circuit 140 selectively turns off the first gate driver circuit 230 and hence turns off Q1 by providing a high signal CNT at the output 222 of the delay circuit 220.

In this manner, the protection circuit 140 protects the host pin 142 against overvoltage conditions on the D+ port pin 105-1 even when the EN signal is asserted high by the host processor 110. In addition, the protection circuit 140 also protects other host pins and circuitry that may be coupled with the middle node 146. For instance, an overvoltage condition on the middle node 146 may cause the middle node voltage VMID to rise above the nominal level (e.g., 3.3 V) of the supply voltage VDD used to power the transmitter circuit Q3, Q4 of the data mux 124. For example, a 5 V overvoltage condition at VMID can cause forward conduction through the transmitter diode D to the VDD supply node, which could adversely affect a host circuit providing VDD to the controller IC 120 and/or could adversely affect other host circuitry operated according to VDD. Moreover, a high voltage on the middle node 146 could adversely impact the host circuit 110 providing the enable signal EN through the host pin 146 through leakage paths of the gate driver circuit 240.

In operation, the detection circuit 210 is connected to the middle node 146 to receive the voltage signal VMID, and the detection circuit output delivers or provides the overvoltage detection signal OVD in a first state (e.g., HI) in response to the middle node voltage signal VMID exceeding a reference voltage signal VREF. In one example, for a nominal middle node operating voltage of approximately 3.3 V, the reference voltage VREF can be a corresponding voltage, such as 3.5 V. When the middle node voltage VMID is less than the threshold set by the reference voltage VREF, the detection circuit output 212 provides the OVD signal in a different second state (e.g., LO).

The OVD signal is provided to the delay circuit 220. In one example, the delay circuit 220, the gate 224 and the gate driver 230 form a control circuit that operates Q1 according to the OVD signal from the detection circuit 210. In other embodiments, the delay circuit 220 can be omitted, in which case the second enable signal EN2 operates according to the OVD signal while the first enable signal EN is active high. In this case, the control circuit, including the gate 224 and the driver 230, turn off Q1 in response to the OVD signal changing from a first state (HI) to the second state (LO). By this operation, the transition of the middle node voltage VMID above the reference voltage VREF turns off Q1, which will remain off until the middle node voltage VMID again falls below the reference voltage VREF. In addition, the clamp circuit 216 in certain examples is turned on when Q1 is turned off, thereby turning on the current source to conduct pull down current IPD out of the middle node 146 in response to the overvoltage detection signal OVD changing to the first state.

The current source 216 is turned off to stop conduction of the pulldown current IPD in response to the OVD signal changing back to the second state. Conduction of the pulldown current by the clamp circuit 216, in combination with isolation of the middle node 146 from the port pin 105-1 facilitates recovery of the middle node voltage VMID, particularly where the overvoltage condition was created by a high voltage VPP on the port pin 105-1 and the associated USB cable line. In addition, where the middle node voltage VMID recovers through operation of the clamp circuit 216 to a level low the reference voltage signal VREF, turning on Q1 and deactivating the clamp circuit 216 will cause the middle node voltage VMID to again rise toward the port pin voltage VPP. In this case, the process repeats, with the detection circuit 210 bringing the OVD signal high to again turn off Q1 and enable the clamp circuit 216. Thus, the protection circuit 140 provides protection for the middle node 146 and any associated host pins 142, 143 against overvoltage conditions on the associated port pin 105-1. Where the overvoltage condition persists on the port pin 105-1, moreover, the circuit 140 operates in a repeating or "hiccup" mode to repeatedly separate the port pin 105-1 from the middle node 146 with the clamp circuit 216 facilitating recovery of the middle node voltage VMID to a protected safe level.

In the illustrated example, the asymmetric delay circuit 220 provides a non-zero delay with respect to HI-LO transitions in the OVD signal. This operation can limit the switching frequency of the protection circuit 140. Any suitable non-zero delay can be implemented by the delay circuit 220, for example, approximately 50-100 ns. In this example, the transition of the middle node voltage VMID from above to below the reference voltage VREF causes the comparator 214 to change the overvoltage detection signal OVD from a high level to a low-level. In response to this transition, the delay circuit 220 provides a corresponding HI-LO transition in the control signal CNT at the output 222 a predetermined delay time (e.g., delay time 450 in FIG. 4 below) after the HI-LO transition in the OVD signal. During this delay time 450, moreover, the clamp circuit 216 continues to conduct pull down current IPD from the middle node 146 to GND, and the gate driver 230 continues to maintain Q1 off.

Figure 4:
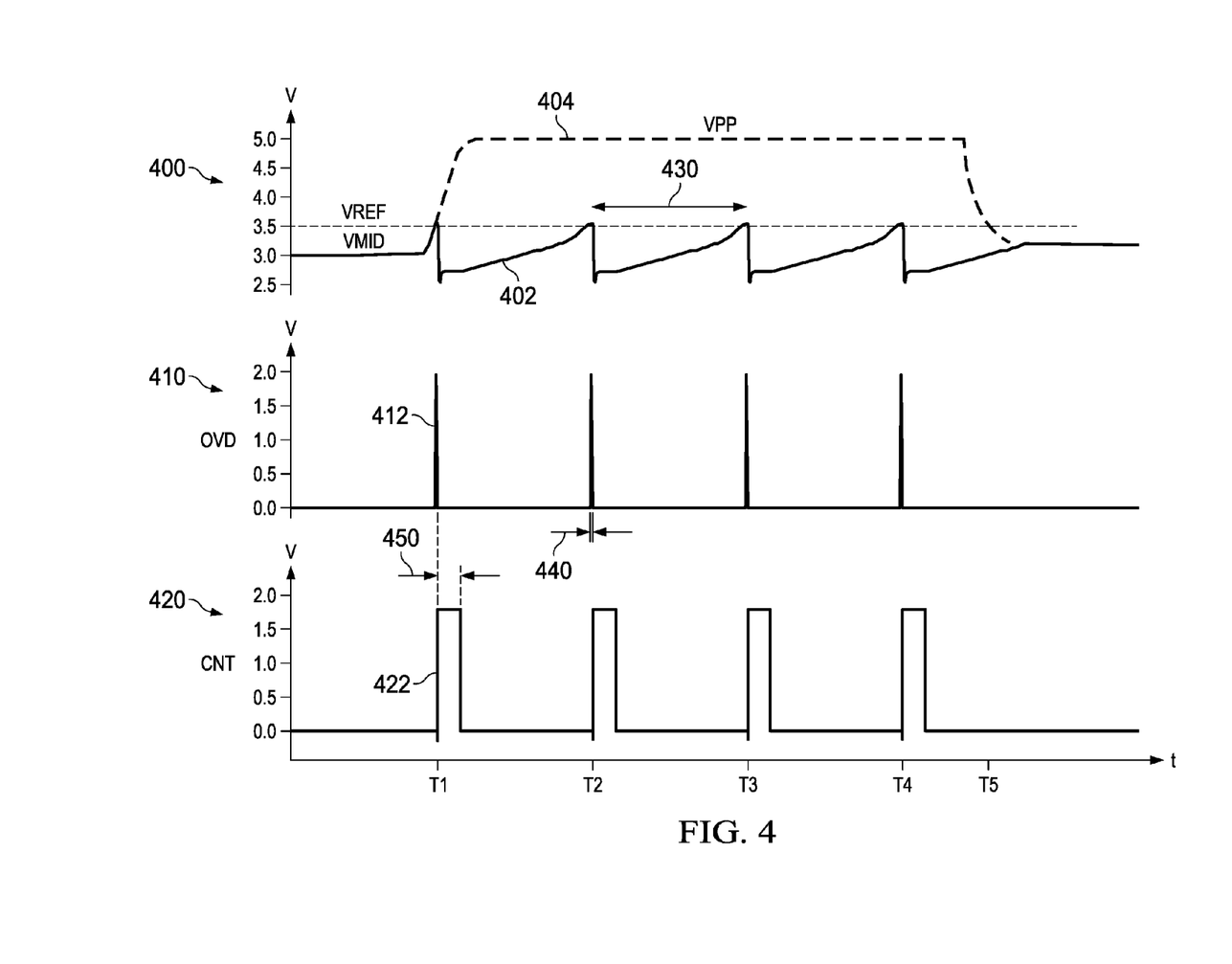
FIG. 4 is a signal diagram of signal waveforms in the protection circuit of FIG. 2.

Referring also to FIG. 4, a graph 400 shows the middle node voltage VMID 402 and a corresponding port pin voltage VPP 404 as a function of time for a situation in which the port pin voltage curve 404 is initially around 3.0 V, and then rises to approximately 5.0 V thereby exceeding a threshold level of 3.5 V at time T1. In this case, the reference voltage VREF provided to the inverting input of the comparator 214 in FIG. 2 is approximately 3.5 V as shown in the graph 400. A graph 410 in FIG. 4 shows the overvoltage detection signal OVD curve 412 provided by the detection circuit 210, and the graph 420 illustrates the control signal CNT voltage curve 422 representing the output of the delay circuit 220 in FIG. 2. The port pin voltage 404 in the example of FIG. 4 remains at an elevated level of approximately 5.0 V until a time T5, where VPP again transitions below VREF.

In this example, the middle node voltage curve VMID 402 in the graph 400 rises with the initial rise in VPP until time T1. In this situation, the transition of VMID above VREF at T1 causes the detection circuit 210 to change the OVD signal state from low to high (curve 412 in FIG. 4), which turns off Q1 and activates the current source of the clamp circuit 216 in FIG. 2. At this point, although VPP continues to rise above VREF in the graph 400, the middle node voltage VMID begins to recover, and is gradually reduced after T1 by operation of the pulldown current IPD. In response to VMID again falling below the reference voltage threshold VREF after T1, the detection circuit output 212 provides a low OVD signal. However, the control signal output CNT from the delay circuit 220 remains high for a non-zero predetermined delay time 450 as shown in the curve 420 of FIG. 4, before transitioning back to a low-level. As seen in the VMID curve 402, the middle node voltage remains at approximately 2.7 V while the CNT signal remains high during the delay time 450, and thereafter begins to transition upward due to the control circuit again turning on Q1 and turning off the clamp circuit 216 when the CNT signal waveform 422 goes low. Thereafter at T2, the middle node voltage VMID again exceeds the reference voltage VREF, causing the detection circuit to change the OVD signal to a high state, and the process repeats in "hiccup" fashion as shown with the process being repeated at T2, T3 and T4 in FIG. 4.

As shown in the example of FIG. 4, the operation of the protection circuit 140 repeats at a generally periodic rate having a period 430 in this case of approximately 2-2.5 μs. The period 430 is controlled by a variety of circuit parameters, including the amount of overvoltage at the port pin 105 relative to the threshold voltage VREF used by the detection circuit 210, capacitance of the middle node 146, etc. In certain implementations, moreover, the circuit 140 protects against extreme overvoltage conditions by advantageously allowing repeated turnoff of Q1, and the switch Q1 need not be turned on fully by the time the next overvoltage condition is sensed by the detector circuit 210. Thus, where the capacitance and other conditions on the middle node 146 allow the middle node voltage VMID to rise quickly when Q1 is turned on after the delay time 450, Q1 may not be fully conductive by the time the detection circuit 210 again senses an overvoltage and quickly changes the control signal GD1 to turn Q1 off again. In addition, the duration of the time 440 (graph 410) in which the OVD signal waveform 412 is active high is largely a function of these and other factors. It is noted in FIG. 4 that the non-zero delay time 450 provided by the delay circuit 220 advantageously avoids or mitigates high-frequency switching, and provides a measure of asymmetric hysteresis for operation of the isolation switch Q1 and the clamp circuit 216. In addition, this use of an asymmetrical delay circuit 210 advantageously mitigates the switching frequency of the protection circuit 140, while still allowing quick turnoff of the transistor Q1, which would not be possible by instead providing symmetric or bi-directional hysteresis in the comparator circuit 214 of the detection circuit 210.

It is noted that the protection circuit 140 prevents conduction through the transistor diode D in FIG. 2 of the transmitter circuit to the voltage supply node VDD, thereby protecting associated digital I/O circuitry such as the data mux 124 or other I/O circuits that are coupled with the middle node 146. In this regard, a variety of different circuits, analog and/or digital, may be multiplexed or otherwise selectively coupled with the middle node 146 for reconfigurable operation of the USB Type-C interconnection system. With respect to protecting digital I/O circuits, such as the data mux transmitter formed by Q3 and Q4 in FIG. 2, other possible solutions could provide protection, for example, by making digital I/O circuits using back to back PMOS circuits to prevent current paths for overvoltage conduction. However, this approach would significantly impact circuit area and circuit cost, since the programmatic configurability of USB Type-C systems requires potentially large numbers of different circuits that can be interconnected to the middle node 146. Moreover, the protection circuit 140 advantageously provides overvoltage protection on negative going host pins. Furthermore, the protection circuit 140 provides a low area, low cost solution compared with simply providing large switches (e.g., switch Q2 in FIG. 2) between each multiplexed circuit and associated host pins that may be coupled with a port pin 105-1.

As further shown in FIGS. 1 and 2, the detection circuit 210 provides the protection operation according to a reference voltage signal VREF. In certain examples, the IC 120 includes a programmable reference circuit 150 with an output 152 providing the reference voltage signal VREF to the detection circuitry 210 of the protection circuit. FIG. 1 shows one example in which the programmable reference circuit 150 operates according to a mode control signal "MODE" 123 from the power control circuit 122 to provide a reference voltage signal VREF at a programmable level. For instance, if a middle node 146 is associated with a port pin 105-1 whose voltage is expected to be at 3.3 V as in the above-described example, the programmable reference circuit 150 may provide a 3.5 V reference to the detection circuit 210. In another example, where the circuitry coupled with the middle node 146 and the associated port pin are suitable for operation at a nominal 2.0 V level, the programmable reference circuit 150 can be set by the MODE signal 123 to provide the reference voltage signal VREF at 2.3 V or some other level suitable for protecting the associated host circuitry. In the example of FIG. 1, the programmable configuration of the USB Type-C interconnection between the host PCB 100 and the connected USB compatible device 104 provides for negotiated and/or programmatically adjusted power levels and interconnection of various circuitry with respect to the USB cable lines, with the power exchange features being implemented by the power control circuit 122 of the controller IC 120. As part of its operation, the power control circuit 122 in one example also sets the reference voltage level VREF by providing the MODE control signal 123 to the programmable reference circuit 150. In other possible implementations, the programmable reference circuit 150 operates according to a control signal or command from a host system, such as the host processor circuit 110.

Figure 5:
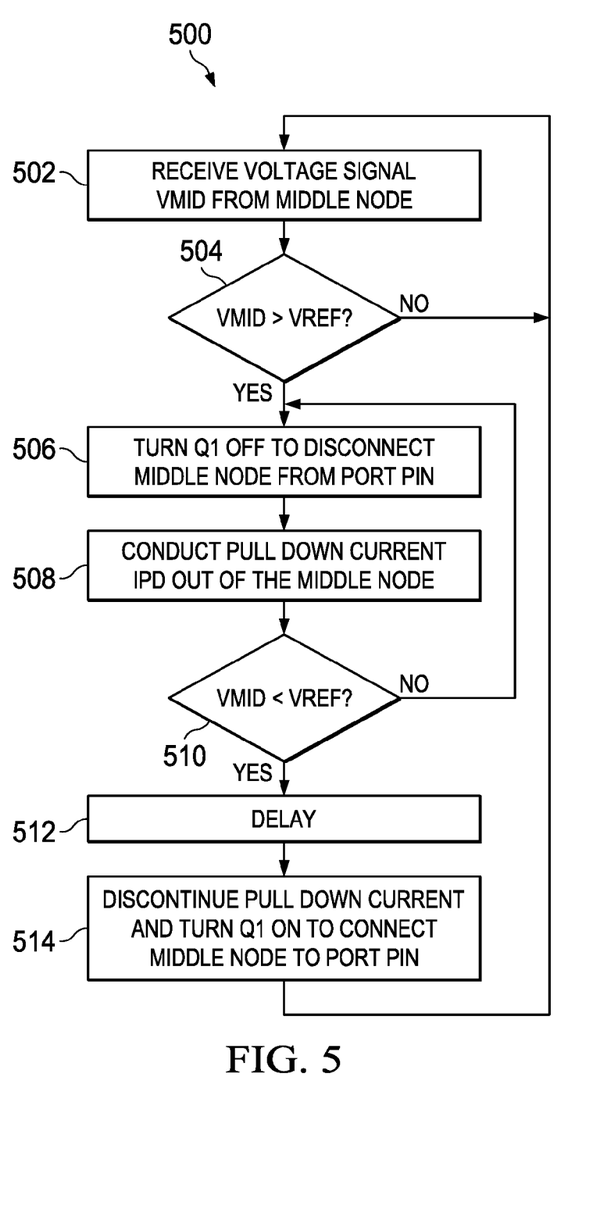
FIG. 5 is a flow diagram of a method of protecting a host circuit from overvoltage on a USB port pin.

Referring also to FIG. 5, disclosed examples further include a method 500 of protecting a host circuit 110 from overvoltage on a universal serial bus USB port pin, such as the D+port pin 105-1 described above. At 502 in FIG. 5, a voltage signal (VMID) is received from the node 146, and is compared at 504 with a reference voltage signal (VREF). If VMID is less than or equal to the reference voltage signal VREF (NO at 504), the process repeats at 502 and 504 with the transistor Q1 in FIG. 2 on to provide electrical coupling between the middle node 146 and the associated port pin 105-1. In response to the middle voltage node VMID exceeding the reference voltage VREF (YES at 504), Q1 is turned off at 506 to disconnect the middle node 146 from the port pin 105-1, and the clamp circuit 216 is enabled to conduct pulldown current IPD out of the middle node 146 at 508 in FIG. 5. After disconnecting the middle node 146 from the port pin 105, the middle node voltage VMID is again compared at 510 with the reference voltage VREF. If VMID remains at or above VREF (NO at 510), Q1 is maintained in the off mode and the clamp circuit remains activated at 506 and 508 as described above. In response to the middle node voltage falling below the reference voltage (YES at 510), the pulldown current is discontinued and Q1 is again turned on to connect the middle node 146 to the port pin 105-1 at 514, and the process 500 returns to 502 as previously described. In certain implementations, the transistor Q1 is turned on and the clamp circuit pulldown current is discontinued at 514 after a non-zero delay time implemented at 512 in FIG. 5.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A circuit to protect a host circuit from overvoltage on a universal serial bus (USB) port pin, comprising:

a first node coupled with a host pin of the host circuit;
a first switch including a first terminal coupled with the first node, and a second terminal coupled with a port pin to receive a signal from a USB cable, the first switch operative in a first mode to allow current flow between the first and second terminals, and in a second mode to prevent current flow between the first and second terminals;
a detection circuit including an input coupled to receive a voltage signal from the first node, and a detection circuit output to provide an overvoltage detection signal in a first state responsive to the voltage signal from the first node exceeding a reference voltage signal, the detection circuit output operative to provide the overvoltage detection signal in a different second state when the voltage signal from the first node is less than the reference voltage signal; and
a control circuit to place the first switch in the second mode responsive to the overvoltage detection signal changing to the first state, and to place the first switch in the second mode responsive to the overvoltage detection signal changing to the second state.

2. The circuit of claim 1, wherein the first switch includes a control terminal to receive a first control signal having a first state to place the first switch in the first mode and a second state to place the first switch in the second mode; and wherein the control circuit includes a first driver circuit to provide the first control signal to the first switch at least partially according to the overvoltage detection signal.

3. The circuit of claim 2, wherein the control circuit is operative to place the first switch in the second mode a non-zero delay time after the overvoltage detection signal changes to the second state.

4. The circuit of claim 3, further comprising a clamp circuit to conduct pull down current out of the first node responsive to the overvoltage detection signal changing to the first state, and to stop conducting the pull down current out of the first node the non-zero delay time after the overvoltage detection signal changes to the second state.

5. The circuit of claim 4,
wherein the detection circuit includes a comparator with a first comparator input coupled to receive the voltage signal from the first node, a second comparator input coupled to receive the reference voltage signal, and a comparator output to provide the overvoltage detection signal in the first state when the voltage signal from the first node is greater than the reference voltage signal, and in the second state when the voltage signal from the first node is less than the reference voltage signal; and
wherein the control circuit includes a delay circuit including an input to receive the overvoltage detection signal, and an output providing a second control signal to place the first switch in the second mode responsive to the overvoltage detection signal changing to the first state, and to place the first switch in the second mode the non-zero delay time after the overvoltage detection signal changes to the second state.

6. The circuit of claim 5, further comprising a gate including an input coupled with the output of the delay circuit to receive the second control signal, and an output to provide a third control signal to the first driver circuit to provide the first control signal to the first switch at least partially according to the second control signal.

7. The circuit of claim 5, wherein the clamp circuit is operative according to the second control signal from the output of the delay circuit to conduct the pull down current out of the first node responsive to the overvoltage detection signal changing to the first state, and to stop conducting the pull down current out of the first node the non-zero delay time after the overvoltage detection signal changes to the second state.

8. The circuit of claim 5, further comprising a programmable reference circuit to provide the reference voltage signal to the second comparator input at a programmable level.

9. The circuit of claim 1, further comprising a second switch coupled between the first node and the host pin, the second switch operative in a first mode to allow current flow between the first node and the host pin, and in a second mode to prevent current flow between the first node and the host pin.

10. This circuit of claim 1, wherein the control circuit is operative to place the first switch in the second mode a non-zero delay time after the overvoltage detection signal changes to the second state.

11. The circuit of claim 10, further comprising a clamp circuit to conduct pull down current out of the first node responsive to the overvoltage detection signal changing to the first state, and to stop conducting the pull down current out of the first node the non-zero delay time after the overvoltage detection signal changes to the second state.

12. The circuit of claim 1, further comprising a clamp circuit to conduct pull down current out of the first node responsive to the overvoltage detection signal changing to the first state.

13. The circuit of claim 1, further comprising a programmable reference circuit (150) to provide the reference voltage signal to the detection circuit at a programmable level.

14. A universal serial bus (USB) interface integrated circuit (IC) to interface a host circuit with a USB cable, the USB interface IC comprising:
a host pin to provide electrical connection to the host circuit;
a port pin to provide electrical connection to a USB cable;
a first node coupled with the host pin; and
a protection circuit to protect the host pin from overvoltage on the port pin, the protection circuit including:
a switch operative in a first mode to allow current flow between the first node and the port pin, and in a second mode to prevent current flow between the first node and the port pin,
a detection circuit including an input coupled to receive a voltage signal from the first node, and a detection circuit output to provide an overvoltage detection signal in a first state responsive to the voltage signal from the first node exceeding a reference voltage signal, the detection circuit output operative to provide the overvoltage detection signal in a different second state when the voltage signal from the first node is less than the reference voltage signal, and
a control circuit to place the switch in the second mode responsive to the overvoltage detection signal changing to the first state, and to place the switch in the second mode responsive to the overvoltage detection signal changing to the second state.

15. The IC of claim 14, wherein the protection circuit includes a clamp circuit to conduct pull down current out of the first node responsive to the overvoltage detection signal changing to the first state.

16. The IC of claim 14, wherein the control circuit is operative to place the switch in the second mode a non-zero delay time after the overvoltage detection signal changes to the second state.

17. The IC of claim 16,
wherein the detection circuit includes a comparator with a first comparator input coupled to receive the voltage signal from the first node, a second comparator input coupled to receive the reference voltage signal, and a comparator output to provide the overvoltage detection signal in the first state when the voltage signal from the first node is greater than the reference voltage signal, and in the second state when the voltage signal from the first node is less than the reference voltage signal; and
wherein the control circuit includes a delay circuit including an input to receive the overvoltage detection signal, and an output providing a second control signal to place the first switch in the second mode responsive to the overvoltage detection signal changing to the first state, and to place the first switch in the second mode the non-zero delay time after the overvoltage detection signal changes to the second state.

18. The IC of claim 14, further comprising a programmable reference circuit to provide the reference voltage signal to the detection circuit at a programmable level.

19. The IC of claim 14, further comprising a second switch coupled between the first node and the host pin, the second switch operative in a first mode to allow current flow between the first node and the host pin, and in a second mode to prevent current flow between the first node and the host pin.

20. A method of protecting a host circuit from overvoltage on a universal serial bus (USB) port pin, the method comprising:
receiving a voltage signal from a node coupled with a host pin of the host circuit;
comparing the voltage signal from the node with a reference voltage signal;
in response to the voltage signal from the node exceeding the reference voltage signal, disconnecting the node from the USB port pin, and conducting pull down current out of the node;
after disconnecting the node from the USB port pin, comparing the voltage signal from the node with the reference voltage signal; and
discontinuing the pull down current and connecting the node to the USB port pin a non-zero delay time after the voltage signal from the node transitions below the reference voltage signal.

\* \* \* \* \*